United States Patent Office 3,611,679
Patented Oct. 12, 1971

3,611,679
AIR CLEANER
David B. Pall, Roslyn Estates, N.Y., assignor to
Pall Corporation, Glen Cove, N.Y.
Continuation-in-part of application Ser. No. 646,903, June
19, 1967, and a continuation of application Ser. No.
738,371, May 31, 1968. This application Jan. 29, 1970,
Ser. No. 7,390
Int. Cl. B01d 45/12
U.S. Cl. 55—457
16 Claims

ABSTRACT OF THE DISCLOSURE

Air cleaners are provided particularly suited for use as one of an array of closely spaced air cleaners for efficiently removing contaminant particles from relatively high velocity air with a low pressure drop. The air cleaner has a tubular body, with an inlet at one end, an outlet at the opposite end, and a central passage therebetween, and a deflector coaxially mounted in the passage adjacent the inlet creating a vortex stream of influent air in the passage, with a generally coaxially tubular outlet member positioned within the outlet end of the tubular body, separating the contaminant particles at the periphery from relatively clean air at the core of the turbulent flow of air through the passage.

Figure 1:
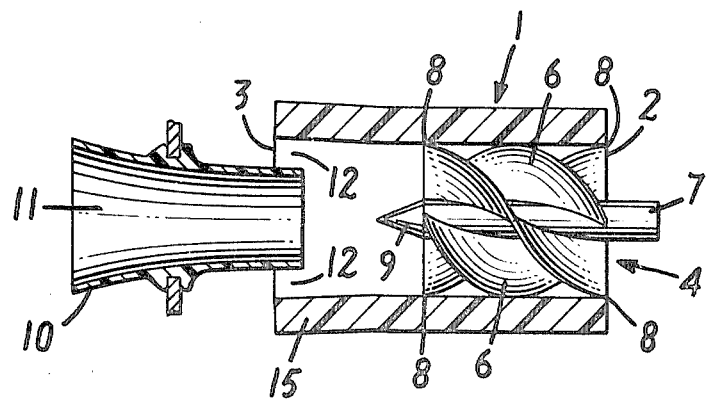

In one embodiment, the passage has an inside diameter of less than about one inch, and the vanes of the deflector extend along the central passage for a length within the range from about 50% to about 60% of the total length of the passage.

In another embodiment, the pitch length in inches of the vanes of the deflector and the inside diameter in inches of the central passage of the tubular body have a relationship that is expressed according to the equation $Pl = Kd^{.68}$, in which K is within the range from about 2.2 to about 3.2.

---

This application is a continuation-in-part of Ser. No. 646,903, filed June 19, 1967, now abandoned, and a continuation of Ser. No. 738,371, filed May 31, 1968, now abandoned.

This invention relates to an air cleaner of the vortex separator type, and to a means for separating clean air from a dirt laden columnar flow of air and more particularly, this invention relates to an improved vortex separator tube assembly and means for cleaning air of high separation efficiency.

Air entering an engine must be substantially free of dust or sand or the engine can become severely damaged in a relatively short time. One means for removing sand or dust from air entering an engine has been to provide tubular air cleaners. These air cleaners remove dust from air by causing a vortex or cyclone stream in the dust laden air passing through the tube. This is accomplished by either placing a deflector in the tube in the path of the influent air stream or by introducing the air stream at a tangent to the tube wall. Since the dust and dirt particles are relatively heavy, they are thrown to the periphery of the tube due to the centrifugal force of the vortex stream. The air at the center of the tube is left relatively free of dust particles. The relatively clean air is normally drawn off from the center of the tube and the dust particles collected at the periphery of the tube.

Devices of this type have in the past been commonly employed on earth moving equipment. However, the conventional vortex air cleaners have proved to be unsuitable for use in connection with aircraft. The problem of removing dust or dirt from air entering an aircraft engine or even entering an aircraft cabin is particularly acute.

Aircraft and particularly turbine driven aircraft, such as helicopters, normally require a high flow of air into the engine during operation. When close to the ground, such aircraft stir up great amounts of dirt and dust which can rapidly destroy an engine. For example, during landing and take-off a typical small helicopter engine and ingest approximately one-half pound of dirt per minute if no air cleaner is provided; larger helicopters can ingest two to four pounds of dirt per minute without an air cleaner. This has resulted in engine failure on helicopters in combat operations in less than 10% of their normal service period, due to dust caused by erosion by the engine. Thus, the problem of removing the dust from the influent air to an aircraft is very serious.

The 6th Annual National Conference on Environmental Effects on Aircraft and Propulsive Systems was recently held at Trenton, New Jersey, to study the problem. The report of this conference indicates the seriousness of the problem.

In aircraft, the problem of removing dust from influent air is complicated by the fact that not only must dirt or dust be removed from the air entering the engine intake, but it must be removed with the least amount of power loss to the aircraft. If the pressure drop in the influent air across the air cleaner is too great, engine power is sacrificed. Moreover, significant power can be lost if the pressure drop is over only several tenths of an inch water column above the permissible amount. Normally, when taking off with a full load a helicopter requires maximum power to get high enough to translate to forward flight. If power is lost due to relatively high pressure drop across the air cleaner, the helicopter will not be able to take off and thus the load will have to be lightened. This can mean that one or more passengers which otherwise could have been accommodated must be left behind. This is highly undesirable, especially in war time conditions.

If, however, in an attempt to maximize power the air cleaner is not used during take-off, a large amount of dust will enter the engine and cause serious damage and perhaps its almost immediate failure.

Another problem in providing an air cleaner for aircraft exists due to the fact that an air cleaner for an aircraft must occupy little space, and be light in weight while still providing enough separation efficiency to remove substantially all dirt particles from the influent air. Heretofore, the air cleaners known to the art were relatively large and relatively heavy for use on aircraft. Moreover, the known air cleaners were not designed to provide, in a compact assembly, a relatively low enough pressure drop in the space allowable on ai aircraft while still removing substantially all the dirt particles from the influent dust laden air.

The instant invention provides an air cleaner and an air cleaning means that removes substantially all particles from dust-laden influent air while minimizing the pressure drop across the air cleaner. This has been done in this invention by determining a relationship between the components of the vortex separator as well as a configuration for each to produce a very low resistance to flow and little turbulence while attaining a very high separation efficiency. Moreover, the applicant has determined that the overall size and weight of the air cleaner tube can be substantially reduced without any loss in efficiency or increase in pressure drop In fact, the applicant has determined that the reduction in size and weight of the assembly actually aids in accomplishing these ends. Although the art relating to vortex separators is old, and well developed, no one heretofore had provided a separator which could be efficiently used on aircraft. Those separators known to the prior art were relatively heavy, relatively large and not designed to provide a low enough pressure drop in a compact package for use on aircraft without impairing the separation efficiency.

The air cleaner of this invention comprises a tubular body of less than about one inch in diameter and having an inlet and an outlet; an angularly vaned deflector disposed at the inlet, said vanes occupying a length that is more than one half the effective length of the tubular body; said deflector being adapted to create a vortex stream in the influent air to concentrate any contaminant particles in the air at the periphery of the tubular body, and clean the air at the center of the tubular body; and a generally tubular outlet member disposed in the outlet of the tubular body and having an end of smaller diameter than the tubular body, defining a generally annular space therebetween through which pass contaminant particles at the periphery of the tubular body, while relatively clean air at the center of the tubular body passes through the central passage of the outlet member.

This invention also provides an air cleaner comprising a tubular body having an inlet and an outlet, and being tapered for at least a portion of its length from the outlet to the inlet at an angle of up to about 10°, such that the diameter of the outlet exceeds the diameter of the inlet; an angularly vaned deflector disposed at the inlet, said vanes occupying the length that is more than one-half the effective length of the tubular body, said deflector being adapted to create a vortex stream in the influent air to concentrate any contaminant particles in the air at the periphery of the tubular body, and clean air at the center of the tubular body; and a generally tubular outlet member disposed at the outlet of the tubular body, and having an end smaller in diameter than the outlet of the tubular body, and defining a generally annular space therebetween through which can pass contaminant particles at the periphery of the tubular body, while relatively clean air at the center of the tubular body passes through the central passage of the outlet member.

This invention provides further an improved vaned deflector for generating a vortex in a stream of air comprising, in combination, a plurality of vanes joined at a central portion, said central portion having a generally conical tip portion extending rearwardly beyond the vanes and adapted to prevent turbulence in the air leaving the vanes.

The apparatus of this invention for separating dirt from air centrifugally comprises establishing a generally columnar flow of dirt laden air, less than one inch in diameter, causing the flowing air within the column to describe a helical vortex extending over more than half the length of the region of the columnar flow, at a velocity sufficient to throw dirt suspended therein to the periphery of the vortex to create a core of relatively clean air at the center of the column, permitting the flowing air within the column to spiral freely over the remainder of the length of the columnar flow, and separately drawing off an annulus of dirty air and drawing off the core of relatively clean air at the end of the region of columnar flow.

The applicant has discovered that the diameter of the separator tube and the diameter of the columnar flow can be reduced with an increase in separation efficiency and a reduction in pressure drop across the tube. The separator tubes and the columnar flows taught by the prior art are of substantially greater size.

The inside diameter of the tubular body and the diameter of the columnar flow of air is less than one inch, and preferably is within the range from 0.5 inch to about 0.75 inch. The term "inside diameter" as used herein refers to the mean diameter at the portion of the tube occupied by the deflector, and to the diameter of the columnar flow at this point.

The applicant has found that these diameters, although smaller than those used by the prior art, provide improved separation efficiency in a package of much smaller size. The prior art was of the opinion that small diameter air cleaners were impractical since they could be subject to plugging by mud or other contaminants. Moreover, the prior art believed that small diameter tubes would be of insufficient flow capacity for aircraft.

The applicant has realized that by improving the configuration of the components of the air cleaner high flow volumes can be accommodated by a small diameter air cleaner. Moreover, by the same features, mud clogging is also avoided. Furthermore, by making the tubular body of a smaller diameter, the assembly can be reduced in overall size. This is due to the fact that dirt particles which are thrown by the centrifugal force of the vortex stream to the periphery of the tubular body need be thrown a shorter distance from the center than in larger diameter tubes, since the tube wall in the instant air cleaner is closer to the center of flow. Therefore, they will travel a shorter distance along the tube before they hit the wall. This means that the length of the tubular body can be substantially reduced. This reduces the overall weight and pressure drop across the assembly without impairing the efficiency of the separation.

The overall length of the tubular body of the instant air cleaner and the length of the region of columnar flow of this can be less than about two inches. Preferably, the effective length is within the range from about 1.4 inches to about 1.75 inches. The term effective length as used in the specification and claims denotes the length of the body from the inlet thereof to the point at which dirt or other contaminant particles are separated by the outlet member. This distance is normally the length of the tube from the inlet to the front of the outlet member. The ratio of the effective length of the tube to its diameter should be maintained within the range from about 2.1 to about 2.6.

The tubular body of the vortex separator and the columnar flow can be substantially cylindrical, and of uniform diameter from the inlet to the outlet.

The applicant has found, however, that improved separation and reduced pressure drop across the body can be obtained if the tubular body and the region of columnar flow is tapered along its length. The tubular body should be tapered from the outlet to the inlet for at least a portion of its length, such that the outlet is of greater diameter than the inlet. This produces a widening column within the region of the air flow.

The tube can be tapered along its entire length from the outlet to the inlet, thus assuming a slightly conical shape. In this construction, the vaned deflector would also be tapered and somewhat conical in shape to match the taper of the tubular body.

The tubular body, however, can also be tapered for only a portion of its length. For example, the tubular body could be substantially cylindrical for a portion of its length in proximity to the inlet. This cylindrical portion preferably corresponds in length to approximately the length of the vaned deflector. The outward taper or flaring of the body can begin at a point immediately adjacent the downstream end of the deflector and continue to the outlet. The cone angle of the taper should be within the range of up to about 10°, and preferably is less than 3°. The tapered portion can be straight sided or curved smoothly within these angle limits. The cone angle as used here is the angle between the two sides of the cone, and is thus twice the angle from one side, or the tangent thereto if curved, to the axis.

It has been found empirically that the taper of the tubular body, and the widening of the diameter of the columnar flow as described above, improves the efficiency of separation and reduces the pressure drop across the assembly. The following is offered as a possible explanation thereof.

The pressure drop across the tubular body from the inlet to the outlet is largely dependent upon the vortexing of the air stream. This is due to the fact that high vortex flows create high wall friction, and this leads to high pressure differentials along the length of the tube.

By flaring or tapering the tubular body from the outlet to the inlet, and widening the columnar flow in the manner described above, the pressure drop is decreased across the tube, due to the fact that a higher area is provided at the outlet. The higher area for a given influent flow reduces the velocity of the air and reduces the wall friction and pressure drop thereby. This reduced vortexing, however, does not impair the separation efficiency due to the fact that dirt particles adjacent to the tubular wall in proximity to the outlet, when a flare is used, will be farther from the tubular outlet member. Thus, there is far less chance that a dirt particle could enter the effluent clean air stream.

The angle of the taper, as indicated above, should not, however, be larger than about 10°. This is due to the fact that when the tubular body is tapered to an angle larger than about 10°, separation of the boundary layer of air adjacent to the wall of the tubular body results. This causes eddy currents which disturb the flow of effluent dirt particles and impair the efficiency of separation.

The taper of the tubular body also presents several other advantages. For example, for a given diameter tubular outlet member, a larger particle of dirt can be removed in the stream of effluent dirt particles without being trapped between the outlet member and the tubular body.

Furthermore, a tapered tubular body is easier to mold than a cylindrical one. This is important since the tubular body is preferably made by molding it from abrasion-resistant plastics, such as nylon and polyurethane.

Any other abrasion-resistant plastic material such as polypropylene, polycarbonate, and polyphenylene oxide can be used, as well as metals such as steel, stainless steel, nickel alloys and the like.

A vaned deflector for generating a vortex stream in the influent air is fixed in the tubular body at the inlet of the tube. The vaned deflector is adapted to generate a vortex stream in the air to throw contaminant particles to the periphery of the body and ensure that they hit or closely approach the wall of the body before they reach the outlet.

The deflector is designed to impart sufficient force to the vortex stream for a given influent flow to attain this result. Moreover, this is accomplished by the instant deflector without producing an undesirably high pressure drop across the air cleaner due to the improved air flow configuration.

The deflector can be bonded in place in the tubular body by any means known to those skilled in the art or it can be merely press-fit in position.

The deflector should be relatively long and the vanes should occupy preferably more than one half the effective length of the tube. However, it should not be more than 60% of the effective length of the tube or the pressure drop across the assembly will be too high and poor separation will result.

The deflector can be composed of about three to six helical vanes, which are supported at their centers preferably on a central hub. Four vanes are preferred. The vanes, if desired, can be tapered in thickness from front to back to reduce the pressure drop across the assembly.

It is important that the helix angle and the pitch length of the vanes be selected such that there is zero daylight from front to back of the deflector. This means that no influent particles can pass through the separator without being deflected from a straight-through course. A pitch length of about 1.7 to about 1.9 inches and preferably from about 1.75 inches to about 1.85 inches for a tube of 0.677 inch in diameter is sufficient to ensure that no particle can pass through the deflector without being deflected.

The ratio of the pitch length of the vanes of the deflector to the inside tube diameter (or the diameter of the deflector) has been found to be quite significant to the pressure drop and efficiency of separation of particles of the air cleaner tube. It has been determined through experiment in accordance with this invention that the ratio of pitch length to diameter which provides that best balance of low pressure drop and high efficiency can be determined by the equation:

$$Pl = Kd^{.68}$$

where $d$ = inside diameter of tube $Pl$ = Pitch length and K is a proportionality constant equal to 2.35 when both $Pl$ and $d$ are in inches This equation has been found to apply to deflectors of both less than and greater than one inch in diameter. The equation given above specifies the optimum pitch length for a deflector of a given diameter to obtain a good balance of low pressure drop and high efficiency. Acceptable efficiencies, however, with low pressure drops can be obtained within a range ratio both above and below the optimum pitch length to diameter ratio. In general, for most deflector diameters, it has been found that a satisfactory efficiency can be obtained at a relatively low pressure drop when the K in the above equation is within the range from about 2.2 to about 3.2 and preferably within the range from about 2.25 to about 2.50.

The deflector preferably has a forwardly extending blunt tip which protrudes beyond the vanes of the deflector for a distance of approximately 0.25 inch. This blunt tip is preferably a cylindrical rod which is an extension of the hub and which has a flat end portion. A dome like end can also be used. These configurations of the hub end assist in guiding air toward the vanes of the deflector without increasing turbulence in the flow. Thus, the tip improves the efficiency of separation without adding to the pressure drop across the unit.

Moreover, the upstream tip provides a convenient member for supporting a guard screen across the front of the tube.

The tip diameter will normally be the same as the hub and should be selected to obtain a balance of low pressure drop and efficient separation. The hub diameter should not be too large, or the pressure drop across the assembly will be increased.

Moreover, if the hub diameter is larger than about 0.25 inch, the boundary layer of air around the hub will become unduly large and a large particle in the boundary layer could possibly pass through the assembly without being removed from the clean air stream at the center of the tube.

However, if the hub diameter is too small, the efficiency of separation is impaired. The ratio of the hub diameter to the diameter of the span of the deflector vanes which obtains the best balance of low pressure drop and separation efficiency is within the range from about 0.20 to about 0.40, and preferably is within the range from about 0.24 to about 0.28. For example, for a 0.677 inch tubular body diameter, the optimum hub diameter is 0.17 inch, and the preferred range of hub diameters is about 0.16 to about 0.19 inch.

The downstream end of the deflector is provided with a rearwardly projecting conical tip, which extends beyond the vanes. This conical tip aids in creating the vortex stream by preventing turbulence in the air leaving the deflector thereby improving the efficiency of separation. The conical tip should be formed to a cone angle of between 30° and 60° and preferably between 36° and 50°. If the conical tip is formed to these angles it will not add to the pressure drop across the vortex tube and separation efficiency will be increased. The cone angle as used here is the angle between the two sides of the cone and is thus twice the angle from one side to the axis.

The deflector can be made of the same or of different material from the tubular body. Abrasion resistant long wearing materials, such as nylon and polyurethanes are preferred. However, plastics, such as polypropylene and polycarbonate as well as metals, such as steel, stainless steel, nickel alloys, and the like, are also suitable.

An outlet member is provided at the outlet end of the tubular body. This outlet member is generally tubular and is preferably frustoconical in shape. It has one end that is smaller in diameter than the tubular body. This end extends into the outlet of the tubular body. The outlet member defines an annular space between itself and the tubular body at the periphery of the tube through which the dust particles are removed. The central passage of the outlet tube is located at the center of the tubular body and clean air is drawn from the assembly through the center of the outlet.

The outlet member should extend into the outlet end of the tubular body for a distance that is equal to from about 0.10 to about 0.25 times the diameter of the tube. The outlet member can be supported in position by tabs, which can be formed on the outlet member and extend to the separator body; it can also be supported by a back plate.

Vortex separator tubes are normally grouped in an array and thus one back plate can be employed to support the outlets of many tubular bodies.

It is also possible to provide a conically shaped lip on the end of the outlet member that is within the tubular body. This conically shaped tip can be used to align the outlet members in the body and can form a baffle to direct the dirt particles to the periphery of the tubular body for discharge. The conical lip can touch the tubular body at one point, and thus align the outlet member in the tubular body. This can be done with only a slight increase in pressure drop.

The cone angle used for the lip is preferably 32° and the angles within the range of 20° to 40° are suitable.

The ratio of the outside diameter of the outlet tube to the inside diameter of the tubular body at the point where the outlet is located can be within the range from about 0.60 to about 0.97 inch.

Any means can be provided to remove particles from the assembly, such as a blower, upstream of the air cleaner, or a compressor or an eductor at the discharge end drawing contaminants from the air cleaner. An eductor is preferred.

In operation, influent dust laden air enters the tubular body and encounters the vaned deflector. The vanes of the deflector form a vortex stream in the influent air and the dust particles since they are relatively heavy are thrown to the periphery of the tube, leaving the air at the center relatively dust-free. The dust particles are collected at the periphery of the tube and are drawn off from the annular space between the outlet member and the tubular body. Clean air is drawn off from the center of the tubular body through the central passage of the outlet.

Figure 2:
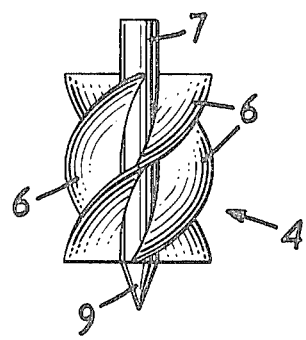

In the drawings:

FIG. 1 is a view in cross-section of an air cleaner in accordance with this invention; and FIG. 2 is a plan of vaned deflector in accordance with this invention.

In FIG. 1, a vortex separator tube assembly in accordance with this invention is shown. It comprises a tubular housing 1 having an inlet 2 and an outlet 3. The tube is made of nylon and has a mean inside daimeter of 0.677 inch at the inlet. Its effective length is 1.55 inches. A vaned deflector 4 is disposed within the tube in proximity to the inlet. The deflector can best be seen by reference to FIG. 2.

The tubular body has an outwardly tapered or flared portion 15 which commences immediately downstream of the portion of the body occupied by the vaned deflector 4. The portion 15 extends from this point to the outlet of the body at an angle of about 2½°.

The deflector is made of nylon and is bonded in position at the inlet by a resin adhesive 8 at the opints at which its four vanes 6 abut the wall of the housing 1. The vanes 6 are helical and are formed to a pitch length of 1.8 inches. The overall length of the tube occupied by the vanes of the deflector 4 is 0.850 inch. The deflector has a cylindrical hub 7 which extends beyond the vanes 6 on the upstream side thereof to form a blunt tip. The hub 7 is 0.17 inch in diameter and extends upstream 0.25 inch beyond the vanes of the deflector. The downstream portion of the hub terminates in a conical tip 9 beyond the vanes. This conical tip is formed to a cone angle of 22°.

A generally tapered tubular outlet member 10 is disposed with one end extending into the outlet end 3 of the tubular body. This outlet member extends into the end of the tubular body for a distance of 0.13 inch. The outside diameter at the end is 0.46 inch. The outlet member has a central open passage 11 therethrough for the removal of clean air. The outlet defines an annular space 12 between the tubular body 1 at the periphery of the tube for the removal of dirt particles. The outlet member is made of polyurethane rubber. The outlet member in this embodiment is supported by a plate not shown.

As an example of the operation of the instant assembly air containing coarse grade test dust, as defined by SAE Recommended Practice J-7269a, was forced through the separator a at rate of 9 s.c.f.m. by a blower, disposed upstream of the vortex separator tube assembly to establish a columnar flow of dirt laden air, less than one inch in diameter. A vortex was created in the stream of air passing through the separator for more than one half the length thereof by the deflector and the dust particles were forced to the periphery of the tube leaving the air at the center relatively clean. The dust particles were drawn off from the annular space 12 between the outlet member 10 and the tube 3, and a core of clean air was drawn off through the central passage 11 of the outlet. A pressure drop of only four inches water column occurred and the separation efficiency was 96.6%.

The overall length of the air cleaner tube assembly was about 2.75 inches from front to back.

This is to be compared with a typical vortex tubular separator of a similar type having a tubular body of 1.47 inches inside diameter, and a four-vane deflector of 2.7 inches pitch length, and no conical downstream tip. The deflector occupies about 0.95 inch of the effective length of the tubular body. This assembly has an effective length of about 3½ inches. This separator tube has an efficiency of only 93% and a pressure drop of 5.8 inches water column at 42.4 s.c.f.m. This represents the same flow per unit area as the tubular air cleaner of the instant invention.

It is to be noted that although there is only a 3.6% difference in efficiency this means that approximately 106% more dirt entered the engine than in the instant apparatus.

Another typical vortex separator of the same type described and characterized above, but having an effective length of about 2⅜ inches was also compared to the instant assembly.

This unit had only an 89% efficiency. This assembly allowed 225% more dirt to enter the engine.

Thus, the instant invention provides an improved means for cleaning air and an improved separator tube assembly of low pressure drop and high separation efficiency that is quite compact and light. It is a substantial improvement over the air cleaners known to the prior art.

The instant air cleaner is particularly suited for removing dust and dirt particles from air entering aircraft engines and passenger cabins. The air cleaner of this invention can be positioned across the air inlet of either the cabin or the engine to thereby clean all influent air. The instant air cleaner can also be used for removing dirt from air on earth-moving equipment, and in any system in which the level of direct concentration in the air is high.

It is to be noted that although the tubular vortex separator of this invention has been described in connection with removing dust particles from air, it is suitable for use in removing any solid contaminants for any gas.

Having regard to the foregoing disclosure, the following is claimed as the inventive and patentable embodiments thereof:

1. An air cleaner particularly suited for use as one of an array of closely spaced air cleaners for efficiently removing contaminant particles from relatively high velocity air with a low pressure drop, comprising, in combination, a tubular body having an inlet at one end, an outlet at the opposite end, and a central passage therebetween, said central passage having an inside diameter of less than about one inch; a deflector coaxially mounted in the passage adjacent the inlet, and having a plurality of spaced centrally joined helical vanes abutting the wall of the passage, and positioned at an angle to the line of air flow from the inlet to the outlet, so as to create a vortex stream of influent air centrifugally concentrating the contaminant particles in the air at the periphery of the passage, and leaving the air at the center of the passage relatively free from contaminant particles; a generally coaxial tubular outlet member positioned within the outlet end of the tubular body, and having an inlet at one end, an outlet at the oppoiste end, and a central passage therebetween for delivery of clean air from the central portion of the central passage of the tubular body; the tubular outlet member being of lesser diameter at the inlet end thereof than the central passage of the tubular body, and defining with the inside wall of that central passage an annular contaminant exhaust passage for the passage of contaminant particles thrown to the periphery of the central passage by the vortex stream; the vanes of the deflector extending along the central passage for a length within the range from about 50% to 60% of the total length of the central passage, measured from the inlet end of the tubular body to the inlet end of the tubular outlet member.

2. An air cleaner in accordance with claim 1, in which the ratio of the length of the central passage of the tubular body to the diameter of the central passage of the tubular body, measured in inches, is within the range from about 2.1 to about 2.6.

3. An air cleaner in accordance with claim 1, in which the diameter of the central passage of the tubular body is within the range from about 0.5 to about 0.75 inch.

4. An air cleaner in accordance with claim 1, in which the vaned deflector has four vanes supported on a central hub having a blunt tip extending upstream of the vanes.

5. An air cleaner in accordance with claim 1, in which the deflector, the outlet member and the body are made of plastic material.

6. An air cleaner in accordance with claim 1, in which the central passage of the tubular body is cylindrical and of uniform diameter from the inlet to the outlet.

7. An air cleaner in accordance with claim 1, in which at least a portion of the central passage of the tubular body is tapered from the outlet to the inlet.

8. An air cleaner in accordance with claim 1, in which the pitch length Pl, in inches, of the vanes of the deflector, measured from end to end of the deflector, and the inside diameter $d$, in inches, of the central passage of the tubular body, give K values within the range from about 2.2 to about 3.2 according to the equation $Pl = Kd^{.68}$.

9. An air cleaner for efficiently removing contaminant particles from relatively high velocity air with a low pressure drop, comprising, in combination, a tubular body having an inlet at one end, an outlet at the opposite end and a central passage therebetween; a deflector coaxially mounted in the central passage adjacent the inlet, and having a plurality of centrally joined helical vanes abutting the wall of the central passage, and positioned at an angle to the line of air flow from the inlet to the outlet, so as to create a vortex stream of influent air centrifugally concentrating the contaminant particles in the air at the periphery of the central passage, and leaving the air at the center of the passage relatively free from contaminant particles; a generally tubular outlet member positioned at the outlet end of the tubular body, and having an inlet at one end disposed within the central passage of the tubular body, an outlet at the opposite end, and a central passage therebetween, for delivery of clean air from the central passage of the tubular body, the inlet of the outlet member being of lesser diameter than the outlet of the tubular body, and defining an annular contaminant exhaust passage between the tubular outlet member and the inside wall of the central passage of the tubular body for the passage of air containing contaminant particles thrown to the periphery of the central passage by the vortex stream; the pitch length Pl of the vanes of the deflector, measured in inches, from end to end of the deflector, and the diameter $d$ of the central passage, in inches, giving K values within the range from about 2.2 to about 3.2, according to equation $Pl = Kd^{.68}$.

10. An air cleaner in accordance with claim 9, in which the central passage of the tubular body is tapered to an angle of less than about 10°.

11. An air cleaner in accordance with claim 9, in which the deflector has a generally conical tip extending rearwardly beyond the vanes adapted to prevent turbulence in the air leaving the vanes.

12. An air cleaner in accordance with claim 11, in which the conical tip is formed to a cone angle of from about 30° to about 60°.

13. An air cleaner in accordance with claim 9, in which the deflector has a hub which has a blunt tip extending upstream of the vanes.

14. An air cleaner in accordance with claim 9, in which the deflector has a hub and the ratio of the diameter of the hub to the diameter of the central passage is from about 0.20 to about 0.40.

15. An air cleaner in accordance with claim 9, in which the deflector has a hub and the hub is less than about 0.25 inch in diameter.

16. An air cleaner in accordance with claim 9, in which the outlet member extends into the outlet end of the central passage of the tubular body for a distance that is about equal to from about 0.10 to about 0.25 times the diameter of the central passage.

References Cited

UNITED STATES PATENTS

| | | |
|---|---|---|
| 308,500 | 11/1884 | Jones. |
| 424,013 | 3/1890 | Mellir. |
| 477,058 | 6/1892 | Luthman. |
| 630,023 | 8/1899 | Baker. |
| 1,279,758 | 9/1918 | Putnam. |
| 2,214,658 | 9/1940 | Browning. |
| 2,415,935 | 2/1947 | Bullock. |
| 2,822,886 | 2/1958 | Schweitzer et al. |
| 2,847,087 | 8/1958 | Johnson. |
| 3,258,895 | 7/1966 | Wiebe et al. |
| 3,360,909 | 1/1968 | Barnerias. |
| 612,207 | 10/1898 | Kincaid et al. |
| 1,735,298 | 11/1929 | Pfeffer. |
| 2,323,707 | 7/1943 | Danz. |
| 2,594,490 | 4/1952 | Patterson. |
| 2,662,610 | 12/1953 | Heinrich. |
| 3,030,755 | 4/1962 | Farr et al. |
| 3,182,748 | 5/1965 | Wirt. |
| 3,448,563 | 6/1969 | Sobeck. |
| 3,362,155 | 1/1968 | Driscoll _____ 55—392 |
| 3,386,230 | 6/1968 | Riesberg et al. _____ 55—457 |
| 1,951,647 | 3/1934 | Cooke _____ 210—572 |

FOREIGN PATENTS

| | | |
|---|---|---|
| 962,402 | 12/1949 | France. |

OTHER REFERENCES

The Dorr Cyclone Bulletin 2502, The Dorr Co., Engineers, Connecticut, 1953, pp. 1–12.

FRANK W. LUTTER, Primary Examiner

B. NOZICK, Assistant Examiner